DIBBEN & BOLLMAN.
MULTIPLYING GEARING.
No. 9,914.  Patented Aug. 9, 1853.
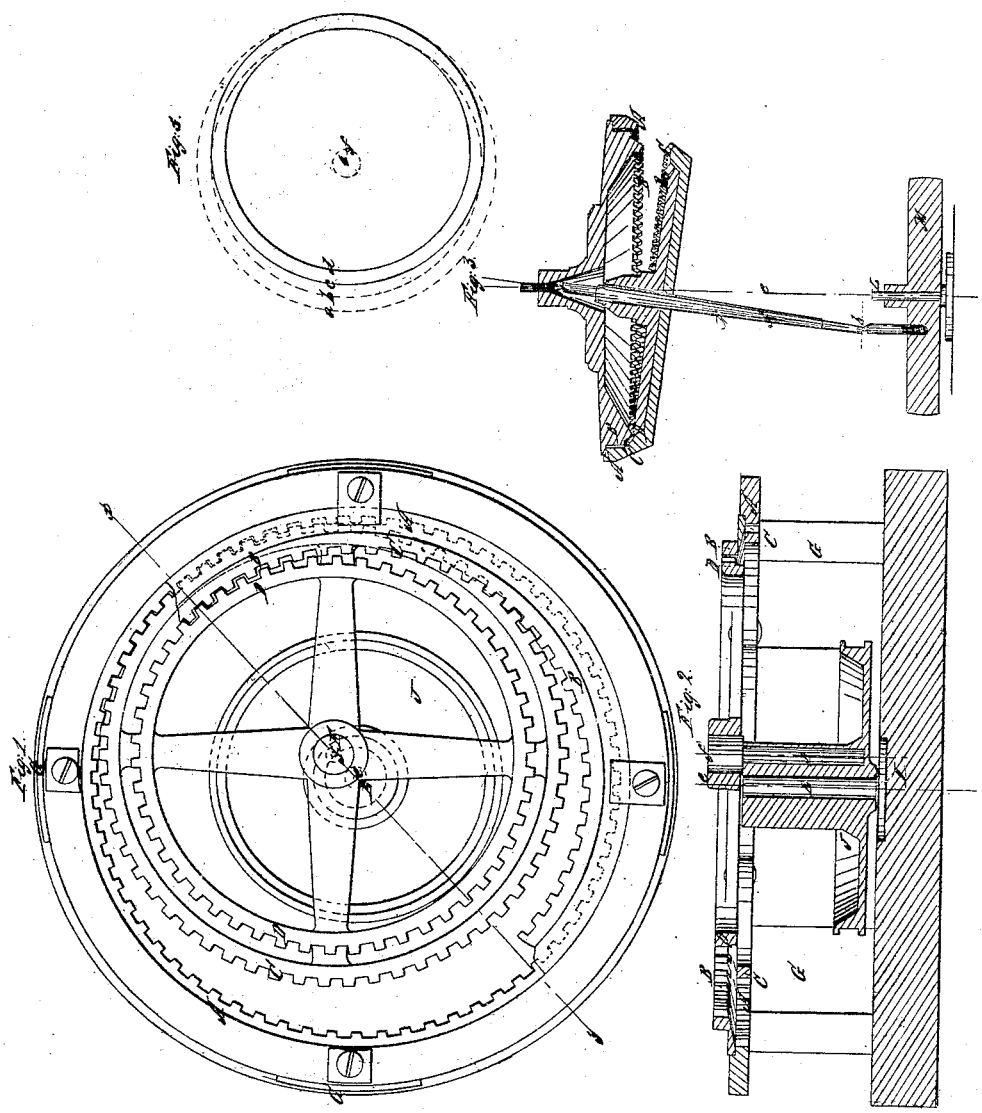

UNITED STATES PATENT OFFICE.

F. DIBBEN AND L. BOLLMAN, OF NEW YORK, N. Y.

MULTIPLYING-GEARING.

Specification of Letters Patent No. 9,914, dated August 9, 1853.

*To all whom it may concern:*

Be it known that we, FRANK DIBBEN and LEWIS BOLLMAN, of the city, county, and State of New York, have invented certain new and useful Improvements in Multiplying-Gearing for Transmitting Rotary Motion at Increased or Decreased Velocities; and we do hereby declare that the following is a full, clear, and exact description of the same, reference being had to the accompanying drawings, forming part of this specification, in which—

Figure 1 is a plan of the simplest form of our invention. Fig. 2 is a section of the same in the line $x$, $y$, of Fig. 1. Fig. 3 is a section of a different modification of our invention. Fig. 4 is a diagram illustrative of the movements of the gearing.

Similar letters of reference where they occur indicate corresponding parts in each of the several figures.

The nature of this invention consists in transmitting rotary motion by means of the difference of proportion between two pairs of toothed wheels or their equivalents, two of the wheels, viz. one of each pair, having a common fixed axis, and the other two wheels gearing into them having a common axis which is capable of revolving around the said fixed axis. By the difference of proportion between the two pairs of wheels we mean the difference between the proportion that the circumference of the two wheels of one pair bear to each other and the proportion that the circumference of the two wheels of the other pair bear to each other.

To enable those skilled in the art to make and use our invention we will proceed to describe its construction and operation.

We will first direct attention to the diagram Fig. 5, in which we will suppose the blue circles $a$, and $b$, to represent the pitch lines of two annular or internal toothed wheels hung loosely upon the common axis $e$, and the red circles $c$, $d$, to represent the pitch lines of two toothed wheels both fast together upon the common axis $f$, $c$ rolling on $a$, and $d$ on $b$, and both the axes $e$ and $f$ stationary in relation to each other. Suppose the circumference or number of teeth in the wheels to be in the following proportions $a=11$, $b=10$, $c=10$, and $d=9$; then if all the circles are made to revolve $a$ will make 100 revolutions for every 99 of $b$. This is estimated as follows:

$$b \times c = 10 \times 10 = 100, \quad a \times d = 11 \times 9 = 99,$$

or while $a=11$ makes 100 revolutions $c=10$ gearing into it will make 110; $d$, being connected with $c$, makes the same number, and while $d=9$ makes 110, $b$ will make 99. We will next suppose the axis $f$, of the wheels $c$, and $d$, to be revolving in a circle around the stationary axis $e$, their pitch lines rolling on the pitch lines of $a$, and $b$, the wheel $a$, being stationary. Then the revolutions of $c$, around $a$, will be in the same proportion to the revolutions of $d$, around $b$, as the revolutions of $a$, were to those of $b$, in the first proposition, viz. 100 to 99; but $c$, and $d$, are upon the same axis $f$, and must revolve the same number of times around the common axis $e$, of the wheels $a$, and $b$. To compensate them for the difference between the revolutions of $c$, around $a$, and $d$, around $b$, the wheel $b$, is made capable of revolving on its axis and makes one revolution forward during every hundred made by $c$, around the stationary wheel $a$, 1 being the difference between 99 and 100. In this last described manner we propose to arrange the toothed wheels or their equivalents in our improved multiplying gearing.

In Figs. 1 and 2, A is an annular spur wheel whose pitch line is supposed to correspond with the pitch line $a$, in Fig. 5. It is stationary, being secured to standards G, G, upon a suitable foundation H. B, is an annular spur wheel whose pitch line is supposed to correspond with $b$. It sits in a suitable recess in or above A, concentric to and in a plane parallel with it, and capable of turning freely. Part of it is seen broken away in the drawing to show A. E, is a spindle or axis which is in line with the axis of the wheels A, and B. J, is a pulley, which is fitted so as to revolve easily upon the spindle E. F, is a pivot, or axis which fits loosely in a hole bored for it in the hub of the pulley J, at a distance from the axis E, so that it is the equivalent of a crank. It carries the two spur wheels C, and D, fast upon it, C gearing into A, and D into B. Their pitch lines are supposed to correspond with $c$, and $d$, in Fig. 5. By giving rotary motion to B, the wheels C, and D, will revolve within A, and B, and their axis $f$, will make 100 revolutions around the axis $e$, for every revolution made by B, giving the pulley J, 100 revolutions to 1 of B, or by giving rotary motion to the pulley every revolution of the pulley will give $\frac{1}{100}$ of a revolution to the wheel B. We will here observe that the Figs. 1 and 2 do not exhibit the precise proportion in size and number of teeth that we have described. The numbers we have chosen are those which afford greatest facility for explanation.

When the axes $e$, $f$, are parallel, the difference between the diameters or the number of teeth of A, and C, must be the same as between B, and D, or the wheels would not gear. The length of the crank or the distance between the axes $e$, $f$, must also be equal to half the said difference between each pair of wheels; but if the two axes are so arranged as to meet in one point and bevel wheels are used the relative differences between the diameters of the wheels of each pair and the length of the crank will vary according to the angle at which the axes are placed with each other and to the distance of the several wheels and of the crank from the point in which the axes meet.

In Fig. 3 the stationary wheel A, is represented as an internal bevel wheel whose axis $e$, is in a vertical line. The wheel B, is also an internal bevel wheel and has the same common axis $e$, being fitted so as to turn freely within A. On a fixed spindle L, in line with the axis $e$, is fitted a pulley M, which is capable of turning freely. Between a point $g$, which is stationary in the line $e$, and a point $h$, which is fixed in the pulley M, is suspended a spindle N, which carries the wheels C, and D, both fast upon it, C being an external bevel wheel gearing into A, and D being a similar wheel gearing into B. The surfaces of all the wheels forming portions of cones terminating in the apex $g$, the point $h$ forms the equivalent of a crank pin, and if the axis $f$, of the wheels C, and D, is caused to revolve around $e$, it describes a cone. Rotary motion given to B, acts upon the axis $f$, in the same manner as the corresponding parts in Figs. 1 and 2, causing it to revolve around $e$, and if the wheels A, B, C, D have the same number of teeth as those in the aforesaid figures then will the revolution of the axis $f$, around $e$, be to the revolution of the wheel B as 100 to 1, and the revolution of the axis $f$ giving motion to the pulley M, will make its revolution in a similar ratio to B. The distance at which $h$, requires to be from the axis $e$, or in other words the length of the crank, would have to be increased if its distance from $g$, were increased, and decreased if its distance is decreased. This will be understood by referring to the red lines $e$, and $f$. The difference in size of the two wheels of either pair A, C, or B, D, will be increased as their distance from the point $g$, increases and decreases as their distance decreases, the wheel upon the axis $e$, increasing in a greater ratio than its fellow upon $f$, as they are placed farther from $g$. By bringing either pair in such a position that a line dividing the angle formed by the planes of their pitch lines will pass through $g$, the two wheels will be of the same size, and in that case three or four teeth in each is all that is necessary, or a universal joint connecting the two axes at $g$, may be substituted for them.

We may here observe that in both of these modifications of the gearing it is immaterial which of the wheels is stationary occupying the position or performing the duty of the wheel A, but it is necessary that the movement of the other wheels shall be the same in relation to the stationary wheel as those described of the wheels B, C, D, in relation to A. Certain variations may be also made in the arrangement of the axes or the manner of attaching the wheels to them; but these are immaterial as not affecting the principle of the invention. It is scarcely necessary to add that in place of toothed gearing friction wheels which are equivalent thereto may be employed throughout the whole apparatus.

The advantages possessed by this multiplying gear over others of a similar character, are, 1st, that there is only one crank, no other cranks, eccentrics, or similar devices being necessary, as the wheels keep each other in gear; 2nd, that the length of the crank is much greater where wheels of a given size are employed, the crank shown in Fig. 1 being $\frac{1}{20}$ of the diameter of the loose wheel B, while if only one pair of wheels be employed it would be $\frac{1}{200}$ to give the same speed; 3rd, that the friction is greatly reduced, as the whole pressure is on the teeth of the wheels; 4th, that a less number of teeth is necessary in the wheels, so that smaller wheels can be used to transmit a given power and speed.

What we claim as our invention and desire to secure by Letters Patent, is,

The employment in any manner substantially as described for the purpose of transmitting rotary motion at a multiplied or decreased speed, of two pairs of toothed or friction wheels A, C, and B, D, combined and arranged as described, to wit: the said wheels being placed upon two axes $e$, and $f$, one $f$, of which is capable of revolving around the other $e$, one wheel of each pair being on the axis $e$, and the other wheel of each pair being placed upon the axis $f$, as herein set forth.

FRANK DIBBEN.
LEWIS BOLLMAN.

Witnesses:
O. D. MUNN,
L. A. WALES.